United States Patent [19]
Carlstrom et al.

[11] 3,713,676
[45] Jan. 30, 1973

[54] PREDEFORMED RABBIT JOINT

[75] Inventors: Lawrence A. Carlstrom, Ballston Lake, N.Y.; George L. Padgett, Greenville, S.C.

[73] Assignee: General Electric Company

[22] Filed: May 7, 1971

[21] Appl. No.: 141,330

[52] U.S. Cl.............287/53 R, 287/129, 416/244 A
[51] Int. Cl................................................F16d 1/06
[58] Field of Search..287/53 R, 129, 130; 416/244 A

[56] References Cited

UNITED STATES PATENTS 2,619,317  11/1952  Traupel........................416/244 A
2,901,214  8/1959  Slemmons.......................287/53 R X

*Primary Examiner*—Andrew V. Kundrat
*Attorney*—William C. Crutcher, James W. Mitchell, Frank L. Neuhauser, Oscar B. Waddell and Joseph B. Forman

[57] ABSTRACT

A rabbet joint and method of forming the rabbet joint, for connecting rotating components such as a turbine wheel and stub shaft, formed from different materials which have dissimilar coefficients of thermal expansion, whereby the component having a higher coefficient of thermal expansion is prestressed and elastically deformed by means of a plug insert, and then machined to fit the other component part.

2 Claims, 2 Drawing Figures

PATENTED JAN 30 1973

3,713,676

INVENTORS:
LAWRENCE A. CARLSTROM,
GEORGE L. PADGETT,

BY James W. Mitchell
THEIR ATTORNEY

PREDEFORMED RABBIT JOINT

BACKGROUND OF THE INVENTION

This invention relates generally to a rabbet joint design useful in joining shafting components wherein the component parts are of dissimilar materials having different coefficients of thermal expansion. More particularly, this invention relates to a rabbet joint for connecting a turbine wheel having a higher coefficient of thermal expansion to a turbine shaft having a lower coefficient of thermal expansion.

It is sometimes desirable from an engineering or cost point of view to fabricate a turbine shaft from one material and to fabricate a turbine wheel from another material. One way of fabricating this type of construction is to slide the turbine wheel concentrically over the turbine shaft, shrink the wheel to the shaft, and then bolt the wheel to the shaft by means of a rabbet joint. A problem arises when these different materials have different coefficients of thermal expansion.

Within the extreme heated environment of a turbine, construction of a turbine wheel from a material different from that of the shaft may result in a severe warping and misalignment condition. Aggravating this condition is a phenomenon known as creep relaxation which results in a permanent deformation of component parts. This problem inhibits the use of certain combinations of materials as turbine components, whereas otherwise they would be highly desirable materials for turbine components.

Another undesirable condition within this type of construction, although it may not produce warping and misalignment, is the ordinary buildup of thermal stresses within the turbine wheel. Within the heated turbine shell, thermal stresses worsen an already highly stressed condition and this may cause early fatigue of the turbine wheel.

OBJECTS OF THE INVENTION

Accordingly, it is an object of this invention to provide a rabbet joint wherein components of different materials may be utilized together as desired.

It is another object of this invention to provide a rabbet joint wherein warping and misalignment due to unequal thermal expansion is minimized.

It is a further object of this invention to provide a more ideal working stress condition between components connected by the rabbet joint.

Other objects, advantages and features of this present invention will become apparent from the following description of a preferred embodiment thereof when taken in connection with the accompanying drawing.

DRAWING

SUMMARY OF THE INVENTION

Figure 1:
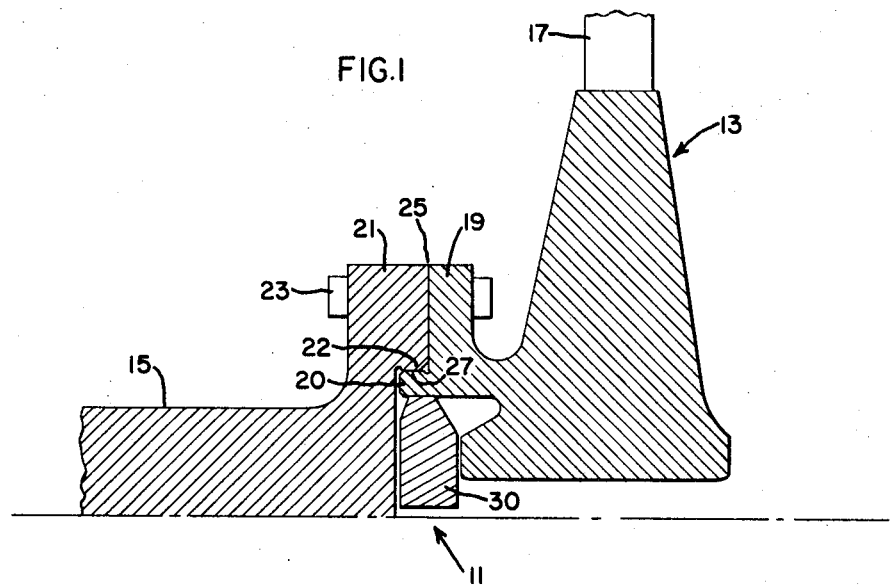
FIG. 1 is an elevation view of the upper half of a turbine shaft and a turbine wheel interconnected in accordance with the present invention.

In the fabrication of a rabbet joint between components of different materials having different coefficients of thermal expansion, the component having the higher coefficient of thermal expansion is elastically prestressed and predeformed to allow for the greater thermal expansion of the component by insertion of a plug within the component. The deformation may then be removed by machining out the component to provide a close fit with the other component part of the rabbet joint. When the component parts are disposed within a heated environment, the predeformed and prestressed component will become unstressed and the thermal growth of the other component will be matched by the thermal growth of the plug and the prestressed component.

DETAILED DESCRIPTION OF THE INVENTION

Referring now to the drawing, there is shown a rabbet joint 11 connecting a turbine wheel 13 to a turbine shaft 15. As has been already mentioned, the present invention can be applied to any shafting connection, but is most useful in a heated environment wherein the coupled components are of two different materials, having two different coefficient of thermal expansion.

As is partially shown, turbine buckets represented by the single turbine bucket 17, are attached to the turbine wheel. The turbine wheel is formed with a flange portion 19, including an axially extending cylindrical lip 20; and the shaft is formed with a flange portion 21, including an axially extending cylindrical lip 22. These two flange portions may be joined by a nut and bolt assembly 23 or any other joining means to form a flange joint 25.

The two flange portions also meet at an annular interface 27 coaxial with the shaft and comprised of the shaft lip 22 and the wheel lip 20. This interface along with the flange joint constitutes a rabbet joint.

Interposed between the shaft and the wheel and bearing against the bottom of the wheel flange is a plug 30. This plug is used to prestress and deform the lip 20 of the wheel flange as will later be described.

The manner in which the present invention is assembled is as follows. For illustrative purposes, it is to be assumed that in the present invention and arrangement of parts, the thermal coefficient of expansion of the wheel exceeds the thermal coefficient of expansion of the shaft, and the thermal coefficient of expansion of the plug is less than the thermal coefficient of expansion of the wheel.

Figure 2:
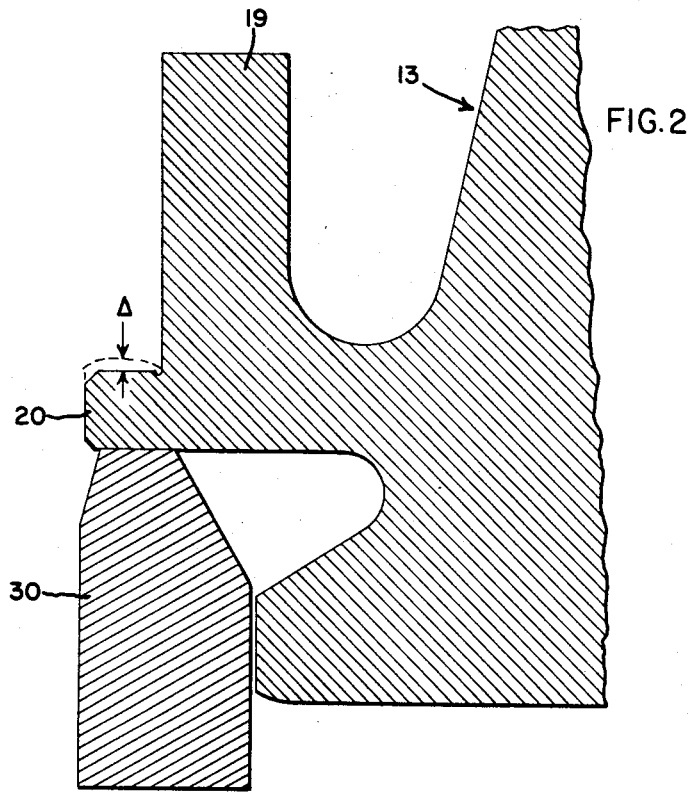
FIG. 2 is an enlarged view of the turbine wheel with the present invention applied thereto showing in part the manner in which the present invention is practiced.

Referring to FIG. 2, the wheel is prestressed and deformed at its flange 19 and its lip 20 by means of fitting a plug 30 into the inner diameter or recess of the wheel flange 19. There are several methods of obtaining this fit. One method requires that the outer diameter of the plug 30 be greater than the inner recess of the wheel flange 19 and that the plug be forced into this inner recess. The other method is practiced by expanding the wheel flange and lip by heating and then placing the wheel over the plug and letting it cool, thus allowing the plug to deform and prestress the wheel. By either method, the prestressing of the wheel lip 20 and flange 19 results in a deformation Δ indicated by the dotted portion in FIG. 2. Thereafter, the dotted portion is removed by machining so that the wheel may be aligned and fitted to the shaft 15 at its flange portion 21 as shown in FIG. 1. An alternative to the machining step is to precast the wheel flange before deformation so that upon fitting the wheel to the shaft, no machining will be necessary. The fit between the wheel and the shaft may be described as an interference fit at the annular interface 27. The shaft and the wheel are then joined by the nut and bolt assembly 23.

The principle of operation of this device depends upon the coefficient of the plug 30 being lower than that of the wheel flange 19. During operation, as the joint is heated, the higher thermal expansion of the wheel flange relaxes the elastic prestress in the wheel flange and the plug. The deflection of the interface surface 27 is determined by the thermal growth of the plug and the growth of the plug allowed by the relaxation of the elastic prestress. Since the thermal deformation at the interface surface 27 is determined by the thermal expansion of the plug and the wheel flange acting together, this deformation can be more properly matched to the deformation of the shaft portion by a judicious choice of coefficient of expansion for the plug material. For example, if the wheel is prestressed and deformed so that it will no longer deform under working conditions, then a judicious choice of a plug would be one where the coefficient of thermal expansion equals that of the shaft material. The resulting stress situation during operation is greatly improved because this assembly greatly reduces the thermal stress induced in the wheel flange. The high stresses in the wheel are present when the wheel is cold and stationary, and these are relieved when the machine is operative. The stresses are reduced as the wheel becomes heated and the creep strength of the wheel material decreases. This reduces the possibility of creep relaxation at operating temperatures.

While there is shown what is considered at present to be the preferred embodiment of the invention, it is of course understood that various other modifications may be made therein, and it is intended to cover in the appended claims all such modifications as fall within the true spirit and scope of the invention.

What is claimed is:

1. A rabbet joint for connecting rotatable thermally dissimilar members comprising:
   a first rotatable member having a first end flange defining a cylindrical interior surface,
   a second rotatable member of a material having a higher coefficient of thermal expansion than said first member and having a second end flange with an axially extending lip thereon coaxial with said first member,
   a third plug member of material having a lower coefficient of thermal expansion than the second member and having a cylindrical exterior surface of greater unstressed outer diameter than the unstressed inner diameter of said lip, and
   means for connecting said first and second flanges together and holding said lip tightly engaged between said first and third member surfaces.

2. The rabbet joint according to claim 1 wherein the plug member has substantially the same coefficient of thermal expansion as the first member.

* * * * *